Jan. 24, 1950  V. W. PETERSON ET AL  2,495,660
PACKING
Filed Dec. 12, 1945
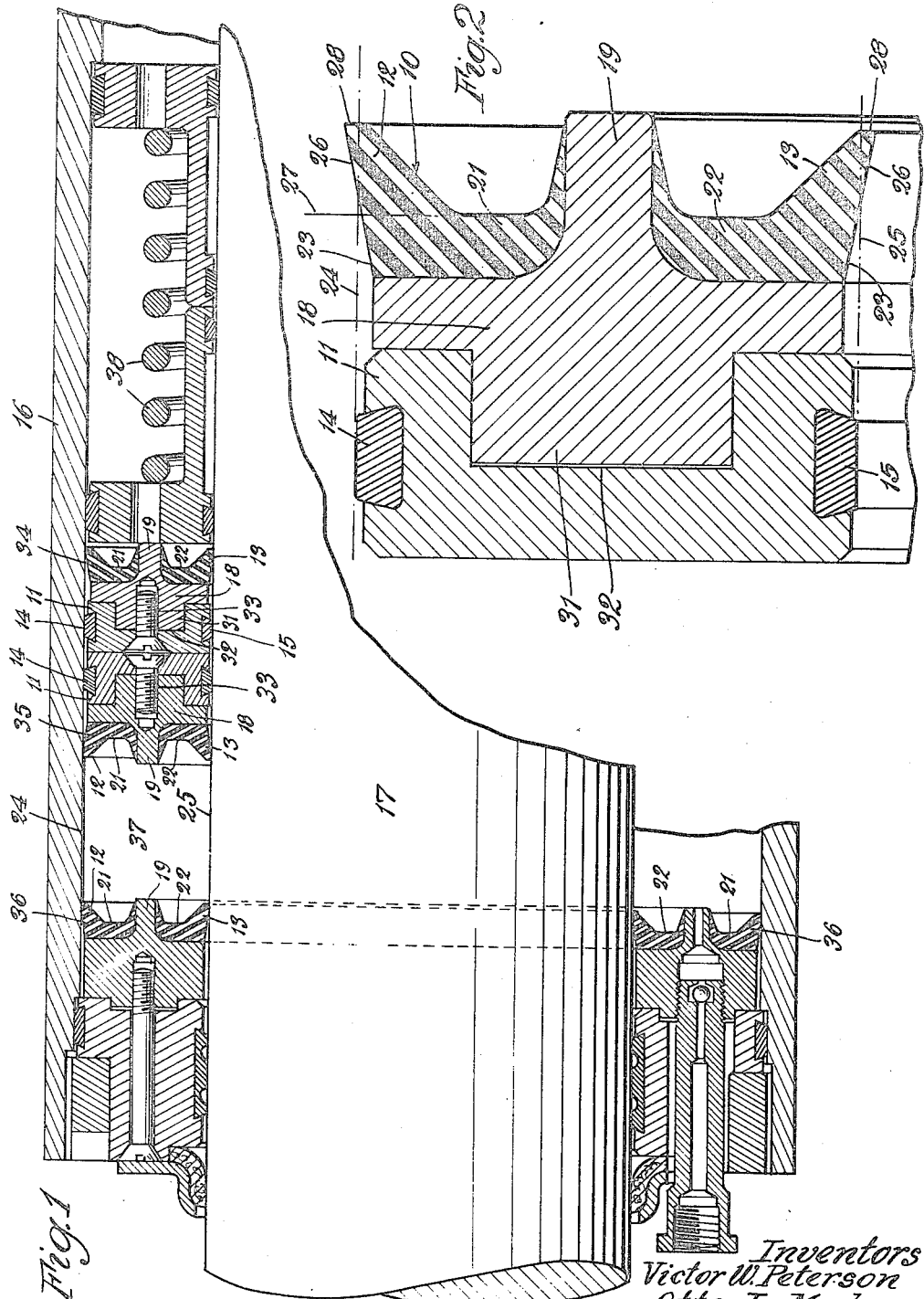
Inventors
Victor W. Peterson
Otto J. Maha
by Roland C. Rehm
Attorney.

Patented Jan. 24, 1950

2,495,660

UNITED STATES PATENT OFFICE 2,495,660

PACKING

Victor W. Peterson and Otto J. Maha, Chicago, Ill., assignors to Hannifin Corporation, a corporation of Illinois Application December 12, 1945, Serial No. 634,482

2 Claims. (Cl. 288—5)

This invention relates to packing for pistons, rods, shafts and the like, and among other objects aims to provide an improved packing particularly designed to seal against leakage under high gas or other pressures.

The nature of the invention may be readily understood by reference to one illustrative construction embodying the invention and shown in the accompanying drawing.

In said drawing:

Fig. 1 is a fragmentary section through a piston rod or plunger packing; and

Fig. 2 is an enlarged fragmentary section through a packing element or ring.

Packing of the type herein involved is intended to seal pistons, rods, shafts, etc., against relatively high pressures (of the order of 1000 pounds per square inch) with minimum friction and without scoring. At sub-zero temperatures inability to maintain the pressure has attended use of packing of this type for reasons not heretofore understood. Tests to discover the cause of faulty operation at low temperatures have demonstrated that the lip of the resilient sealing element of the packing was out of contact with the surface to be sealed, and in fact was in a state of equilibrium (with pressure on both faces) in which condition it was incapable of performing its intended sealing function. This was due to a plurality of causes including the effect of low temperature on the packing, extrusion, and crowding or compression of the packing under the pressure against it, and inability to center the packing in apparatus whose dimensions departed slightly from nominal dimensions.

The illustrative packing is designed to maintain an efficient seal at all temperatures including sub-zero temperatures without causing scoring and with a minimum of friction. It is here embodied in a packing for pistons and piston rods in equilibrators for artillery, since this is particularly illustrative of apparatus subjected for long periods to low temperatures and wherein high gas pressures must be maintained. The illustrative packing comprises an annular sealing element 10 carried on an annular metal bearing or guiding element 11. In this case the sealing element is provided with outer and inner sealing lips 12 and 13 since a seal must be effected against two surfaces. The guiding element 11 is accordingly provided with outer and inner bearings 14 and 15 for the same surfaces.

The packing is here shown in a stuffing box 16 for a piston rod or plunger 17, but it will be understood that the same packing (except for changes in dimensions) could be employed around a piston to effect seals against the outer cylinder surface and the inner piston surface.

The sealing element 10 is advantageously a synthetic rubber of such composition that it will retain its resilience at sub-zero temperatures. A suitable composition of this character is one employed in aircraft packings wherein low temperatures are encountered for long periods. The element is bonded (as by vulcanizing) to a metal ring which in this case is of T-section to provide a web 19 extending beyond the ends of the lips 12 and 13 to serve, if necessary, as a spacer to prevent compressing of the packing endwise against any other element. In this case, since inner and outer sealing lips are required, web 19 is centrally located with respect thereto and the latter are provided with separate integral bases 21 and 22 bonded to the ring 18 and to opposite sides of web 19.

The bases 21 and 22 are designed so as to be spaced as at 23 from the surfaces 24 and 25 to be sealed, a distance sufficient to prevent contact of the base with such surface under the extruding or crowding of the material of the sealing element under the pressure to which it is subjected. The outer surface 26 of the lips 12 and 13 diverges so that the extremity of the lips is of greater diameter and less diameter respectively than the surfaces 24 and 25 to be sealed, but the taper thereof is such that when the sealing element is in place only the lips contact with the surfaces 24 and 25, that is, the portion of the sealing element lying beyond (outside plane 27) the base of the sealing element. In other words, as illustrated in Fig. 2, no part of the base 21 or 22 contacts with the surface to be sealed. The base cannot, therefore, be crowded or extruded into contact with the surface to be sealed. Therefore there is no tendency to crowd or deflect the lips 12 or 13 away from the surface to be sealed and thus place them in a state of balance (with pressure on both sides of the lips) where they can perform no effective sealing function. Since only the lips can contact the aforesaid surfaces, the pressure confined in the cylinder will effectively press them against said surfaces to maintain an efficient seal.

The tip 28 of the lips preferably faces toward the high pressure, and therefore performs the major sealing function. It is therefore made relatively blunt and thick so as not to be easily deflected away from the surface, and thereby to minimize the thickness of the oil film adhering to the surface.

Often a plurality of sealing rings are used, particularly to guard against accidental failure of one ring, but the leading ring, that is the one next the pressure, carries substantially all the burden of sealing.

The guiding or bearing element 11 is advantageously made separable from the sealing ring to permit it to be finished exactly to size in the case of an oversized cylinder, rod, etc. If the bearing elements were integral with the sealing elements, it is not possible to machine the bearing surface to exact size. While an effort is made in manufacture to finish the cylinders, rods, etc., to an exact or nominal size, some tolerance must be permitted, but until assembly of the packing with the cylinder, exact dimensions are not known. In the present separable construction, the bearings 14 and 15 of a bearing element may be machined on the job to fit the exact cylinder or rod dimensions, and then assembled with a sealing element. Also either bearing or sealing element may be replaced in the field without replacing the other. With the bearing element machined to proper size, the sealing element is centered in the packing with the sealing lips bearing equally around the entire circumference. The sealing element is not obliged to serve also as a bearing element (for which it is not suited) as is the case where the bearing element is undersize. The two elements are centered on each other preferably by rabbeting. In this case the ring 18 carries a rib 31 adapted to set into a mating groove 32 on the bearing element. The two elements are separably connected by screws 33.

The illustrative packing whose details may be considerably varied, comprises three sealing elements 34, 35 and 36, the first of which performs the major sealing function, and the other two confine lubricating oil or grease between them in the space 37 to lubricate the surfaces. The lubricant is maintained under some compression by spring 38. The lips of the sealing elements prevent escape of lubricant, and in the case of failure of the first sealing element 34, also perform a sealing function.

Obviously the invention is not limited to the details of the illustrative apparatus since these may be variously modified. Moreover, it is not indispensable that all features of the invention be used conjointly since various features may be used to advantage in different combinations and sub-combinations.

Having described our invention, we claim:

1. A packing of the character described comprising in combination an annular sealing element of synthetic rubber or the like adapted to remain resilient at sub-zero temperatures, said element having a substantially thick base which under compression is of a diameter different from that of the surface to be sealed so as to be spaced therefrom in use, a flexible sealing lip diverging from said base to such diameter that the lip must be compressed to fit the surface to be sealed, said lip diverging at such angle that the region of contact with said surface lies wholly outside side base, a rigid supporting ring to which said base is bonded, a bearing element having a bearing surface machined to have a bearing fit with said surface, means for centering said bearing ring on said sealing ring, and means including an inter-fitting rib and groove for separably connecting said bearing ring and sealing ring together.

2. A packing for sealing against high pressures comprising in combination an annular sealing element of resilient synthetic rubber or the like capable of remaining resilient at sub-zero temperatures, said element having outer and inner sealing lips adapted respectively to contact with outer and inner surface to be sealed, said lips having a substantially thick integral base of such diameter that under compression of the fluid sealed, it remains spaced from the surfaces to be sealed, said lips diverging therefrom so that the region of contact with said surfaces lies wholly outside said base, a rigid annular supporting ring of T-section to which said base is bonded, a bearing ring having outer and inner bearing surfaces machined to have a bearing fit with said surfaces, and means including an inter-fitting rib and groove for separably connecting said bearing ring with said supporting ring and for centering the latter on said bearing ring.

VICTOR W. PETERSON.
OTTO J. MAHA.

REFERENCES CITED

The following references are of record in the file of this patent:

UNITED STATES PATENTS

| Number | Name | Date |
|---|---|---|
| Re. 16,978 | Joyce | May 29, 1928 |
| 1,779,938 | Joyce | Oct. 28, 1930 |
| 2,214,261 | Roth | Sept. 10, 1940 |
| 2,309,446 | Ekkebus | Jan. 26, 1943 |
| 2,417,828 | Joy | Mar. 29, 1947 |

FOREIGN PATENTS

| Number | Country | Date |
|---|---|---|
| 560,515 | Great Britain | of 1944 |